(12) United States Patent
Huo et al.

(10) Patent No.: US 10,552,529 B2
(45) Date of Patent: Feb. 4, 2020

(54) DATA CHANGE ALERTS IN A COLLABORATIVE ENVIRONMENT

(71) Applicant: International Business Machines Corporation, Armonk, NY (US)

(72) Inventors: Qi Feng Huo, Beijing (CN); Wen Min Dou, Beijing (CN); Hua Shao, Beijing (CN); Jonathan Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 15/585,414

(22) Filed: May 3, 2017

(65) Prior Publication Data
US 2018/0321829 A1   Nov. 8, 2018

(51) Int. Cl.
G06F 17/24   (2006.01)

(52) U.S. Cl.
CPC ......... *G06F 17/245* (2013.01); *G06F 17/246* (2013.01)

(58) Field of Classification Search
CPC .... G06Q 10/101; G06Q 10/103; G06Q 10/10; G06F 17/246; G06F 17/245
See application file for complete search history.

(56) References Cited

U.S. PATENT DOCUMENTS

| | | | | |
|---|---|---|---|---|
| 6,006,239 | A * | 12/1999 | Bhansali | G06F 17/246 |
| 8,869,039 | B2 | 10/2014 | Rein et al. | |
| 9,286,342 | B1 | 3/2016 | Chitilian et al. | |
| 9,471,897 | B1 * | 10/2016 | Dunne | G06F 3/0481 |
| 9,584,565 | B1 * | 2/2017 | Ho | H04L 65/403 |
| 2004/0153504 | A1 * | 8/2004 | Hutchinson | G06Q 10/10 709/204 |
| 2005/0114487 | A1 * | 5/2005 | Peng | G06F 16/958 709/223 |
| 2007/0136666 | A1 * | 6/2007 | Khen | G06F 17/246 715/217 |
| 2008/0209280 | A1 * | 8/2008 | Dilillo | G06F 11/0709 714/48 |
| 2009/0235152 | A1 * | 9/2009 | Rampson | G06F 17/246 715/207 |
| 2009/0248801 | A1 * | 10/2009 | Then | G06Q 10/10 709/204 |

(Continued)

FOREIGN PATENT DOCUMENTS

WO   2007072051 A2   6/2007

OTHER PUBLICATIONS

Chambers et al., "SheetDiff: A Tool for Identifying Changes in Spreadsheets", *This work is partially supported by the National Science Foundation under the grant CCF-0917092 and by the Air Force Office of Scientific Research under the grant FA9550-09-1-0229, printed on Apr. 7, 2017, 8 pages.

*Primary Examiner* — Nicholas Klicos
(74) *Attorney, Agent, or Firm* — Edward J. Wixted, III

(57) ABSTRACT

A method for generating data change alerts in a collaboration environment and highlighting changes. The method generates a message that contains information on a data change event, in response to a first user changing data in a cell of a data table. The method further determines whether there is a representational object that is based on the data being changed, and if so, alerting a second user, who is associated with the representational object, of the data change. Moreover, the data change is highlighted in the representational object.

20 Claims, 5 Drawing Sheets

(56) References Cited

U.S. PATENT DOCUMENTS

| | | | |
|---|---|---|---|
| 2010/0088692 A1* | 4/2010 | Rathi | G06F 8/65 717/171 |
| 2010/0174678 A1 | 7/2010 | Massand | |
| 2011/0202588 A1* | 8/2011 | Aggarwal | H04W 4/20 709/202 |
| 2012/0151315 A1* | 6/2012 | Campbell | G06F 17/246 715/212 |
| 2012/0284344 A1* | 11/2012 | Costenaro | G06F 17/241 709/206 |
| 2013/0117651 A1* | 5/2013 | Waldman | G06F 17/246 715/220 |
| 2013/0159440 A1* | 6/2013 | Appelman | G06F 9/542 709/206 |
| 2013/0254270 A1* | 9/2013 | Rochelle | G06F 17/246 709/203 |
| 2014/0032501 A1 | 1/2014 | Dulaney et al. | |
| 2014/0082093 A1* | 3/2014 | Savage | H04L 41/50 709/206 |
| 2014/0115146 A1* | 4/2014 | Johnson | H04L 43/0876 709/224 |
| 2014/0136995 A1* | 5/2014 | Matas | G06F 3/0481 715/753 |
| 2014/0267287 A1* | 9/2014 | Dodgen | G06T 11/206 345/440 |
| 2014/0281867 A1* | 9/2014 | Vogel | G06F 17/246 715/212 |
| 2014/0281870 A1* | 9/2014 | Vogel | G06F 17/246 715/220 |
| 2014/0292765 A1* | 10/2014 | Maruyama | G06T 11/206 345/440 |
| 2014/0380193 A1* | 12/2014 | Coplen | G06F 3/04847 715/753 |
| 2015/0019654 A1* | 1/2015 | Wheeler | H04L 51/24 709/206 |
| 2015/0193492 A1* | 7/2015 | Gunaratne | G06F 17/30345 707/609 |
| 2016/0173541 A1* | 6/2016 | Gusain | H04L 65/403 715/212 |
| 2016/0308940 A1* | 10/2016 | Procopio | G06F 3/04842 |
| 2016/0378737 A1* | 12/2016 | Keslin | G06F 3/1415 715/753 |
| 2017/0061360 A1* | 3/2017 | Rucker | G06Q 10/063114 |
| 2017/0134516 A1* | 5/2017 | Gutman | H04L 67/26 |
| 2017/0307480 A1* | 10/2017 | Uchida | G06F 3/14 |
| 2017/0315979 A1* | 11/2017 | Boucher | G06F 7/544 |
| 2018/0121433 A1* | 5/2018 | Nevrekar | G06F 1/3053 |
| 2018/0232346 A1* | 8/2018 | Konnola | G06F 17/24 |

* cited by examiner

DATA CHANGE ALERTS IN A COLLABORATIVE ENVIRONMENT

BACKGROUND OF THE INVENTION

The present invention relates to the field of collaborative operation, and more specifically, to a method, a system and a computer program product for generating data change alerts in a collaboration environment.

In a collaboration environment, data in the form of a data table or file is shared by a plurality of users and can be manipulated by the plurality of users simultaneously. Changes made by other users to data are reflected to the current user at the same time or in a short time so that multiple users can collaboratively work on the up-to-date data.

The data table may be a table from a database or a spreadsheet. To discover who makes a change or when a change is made in a collaboration environment, for example in a digital data spreadsheet application, the conventional method is to track changes to data cells of spreadsheets. There are quite a number of desktop applications or online collaborative editing web applications for spreadsheets. These applications may allow users to track data or formula changes of a spreadsheet. The change tracking in such systems are for the purpose of checking change of data per se.

SUMMARY

According to an aspect of the present invention, there is a method, computer program product and/or system for highlighting a data change in a collaborative environment that performs the following operations (not necessarily in the following order): (i) detecting a first data change, made by a first user, in a cell of a data table; (ii) in response to detecting the first data change, generating a first message that contains information pertaining to the first data change; (iii) determining that there exists a representational object that is based on the cell of the data table; (iv) in response to the determination: determining that there is a second user associated with the representational object, and sending a first alert to a user interface, where the first alert is based on information in the first message, and wherein the first alert comprises rendering a visual clue in the user interface.

DETAILED DESCRIPTION

The present invention will now be described in detail with reference to the Figures.

Some embodiments of the present invention can be implemented in various manners. The present disclosure thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
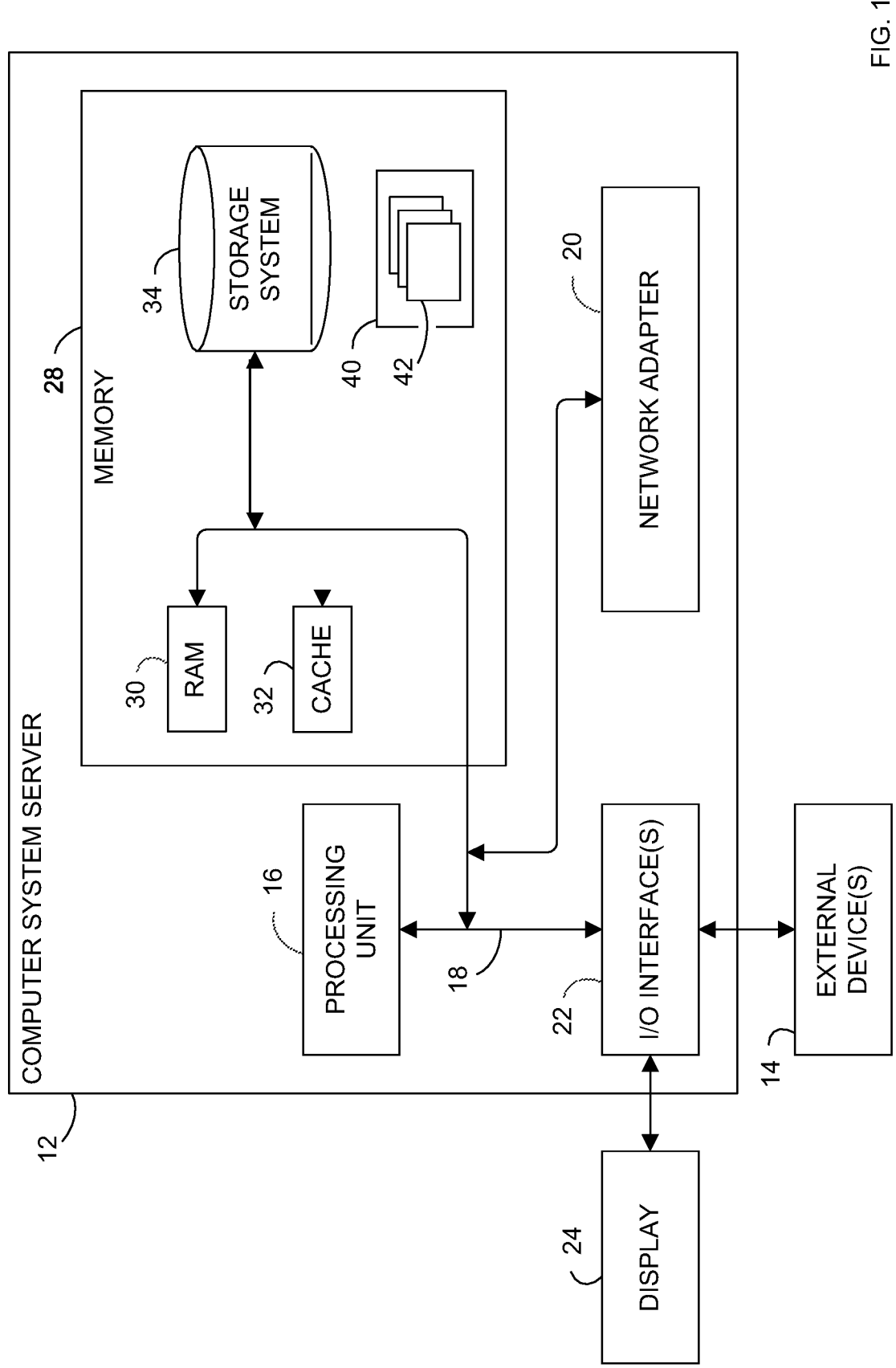
FIG. 1 is a block diagram depicting components of a computer, in accordance with at least one embodiment of the present invention.

Referring now to FIG. 1, computer system/server 12 which is applicable to implement the embodiments of the present invention is shown. Computer system/server 12 is only illustrative and is not intended to suggest any limitation as to the scope of use or functionality of embodiments of the invention described herein.

The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include industry standard architecture (ISA) bus, micro channel architecture (MCA) bus, enhanced industry standard architecture (EISA) bus, video electronics standards association (VESA) local bus, and peripheral component interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc. ; one or more devices that enable a user to interact with computer system/server 12; and/or any devices (for example, network card, modem, etc. ) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant arrays of independent disks (RAID) systems, tape drives, and data archival storage systems, etc.

In the collaboration environment, there are some representational objects, such as bar chart, pie chart, line chart, area chart, scatter chart, etc. that are based on data in a data table. These representational objects are popular ways to present data because a chart or a diagram is often a good way to understand large quantities of data and relationships between parts of the data. Along with more and more online collaborative editing applications, not every editor has an intuitive image of the changes made by other editors.

Some embodiments of the present invention may include one, or more, of the following features, characteristics and/or advantages: (i) alerts users in a collaboration environment, to a data change, in a timely and intuitive way; (ii) alerts editors of a change in a representational object (for example, a graph) corresponding to a change in the underlying data; (iii) informs users of a change in a representational objects (for example, graphs, diagrams or charts) that represents a given data set in a data table. Note, that a single data element is sometimes herein referred to as a datum.

Figure 2:
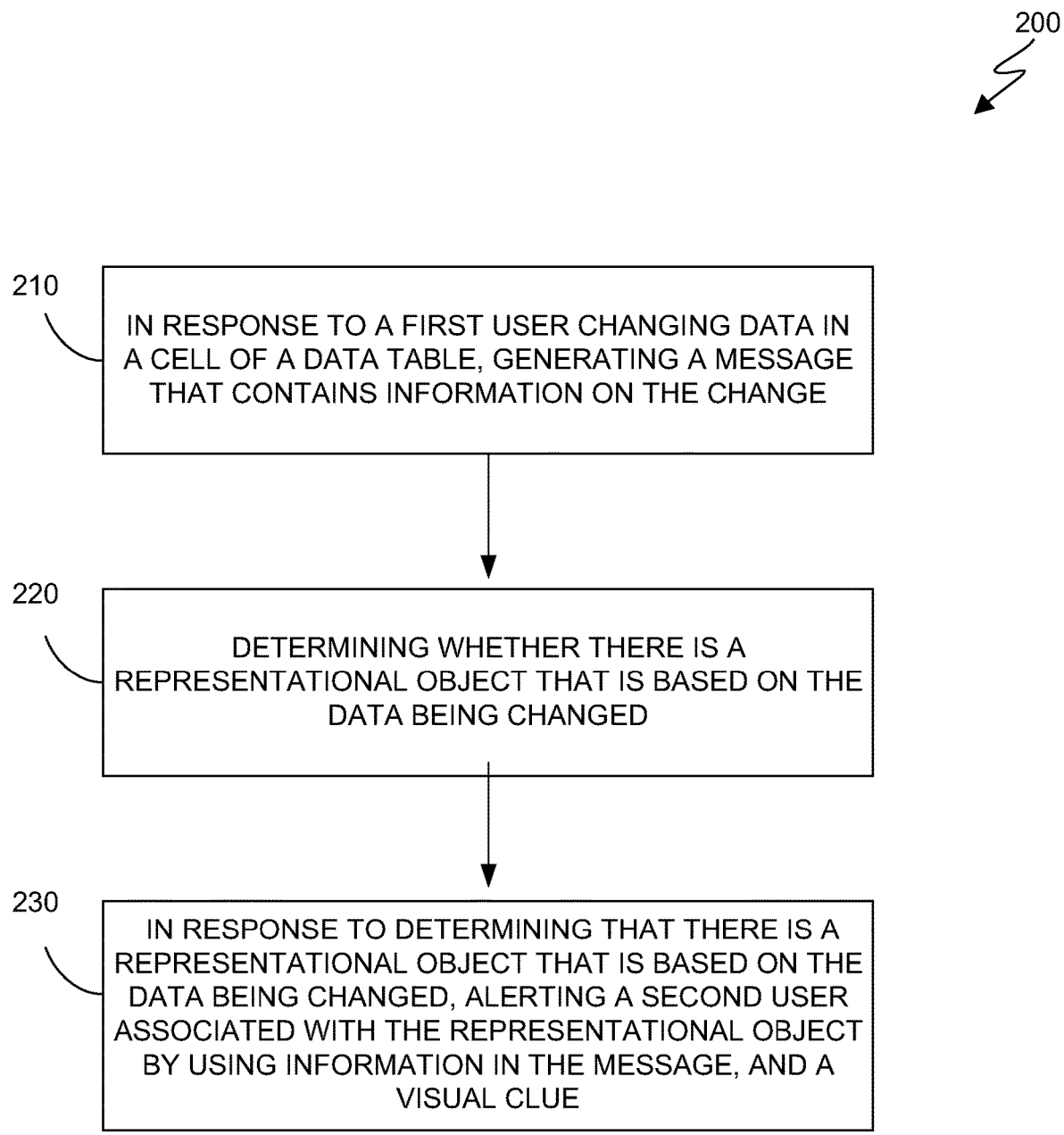
FIG. 2 is a flowchart showing a change handling method in accordance with at least one embodiment of the present invention.

Flowchart 200 of FIG. 2 illustrates a method for generating data change alerts in a collaboration environment according to an embodiment of the present invention. As shown in FIG. 2, an embodiment method for generating data change alerts in a collaboration environment includes a change message storing operation 210, an impacted object determining operation 220, and a change alerting operation 230. In one embodiment of the invention, the method in FIG. 2 will be performed in a server, and a plurality of users use their clients connected to the server to edit data on the server.

Specifically, in the change message storing operation 210, in response to user input from a first user (or any process, automated or not) that changes data in a cell of a data table (or any other data structure), a message is generated that contains information about the data change. The data table may be a table from a database or a spreadsheet file. The data table is composed of cells. In the following description, the spreadsheet is used as an example to describe the details of embodiments. Each time data in a cell is changed, a corresponding message is generated. The message may be stored in some way. There might be multiple messages generated as a result of multiple changes made over time. In one embodiment, the messages may be stored in a queue according to the time they are generated.

Figure 3A:
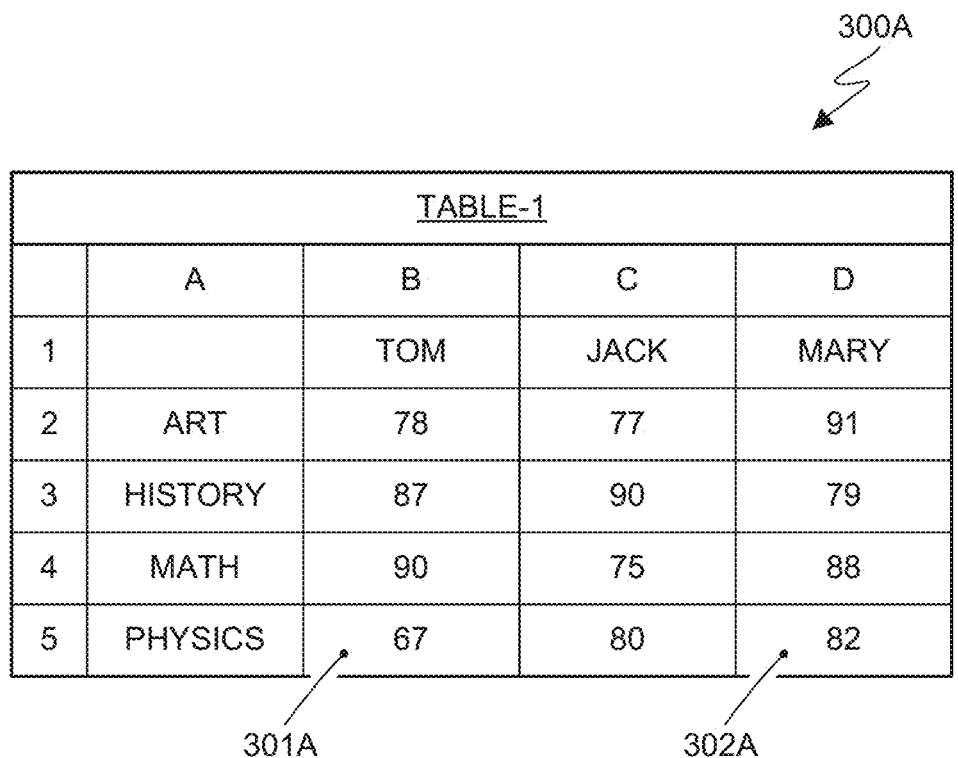
FIG. 3A shows a portion of a spreadsheet, in accordance with at least one embodiment of the present invention.
Figure 3B:
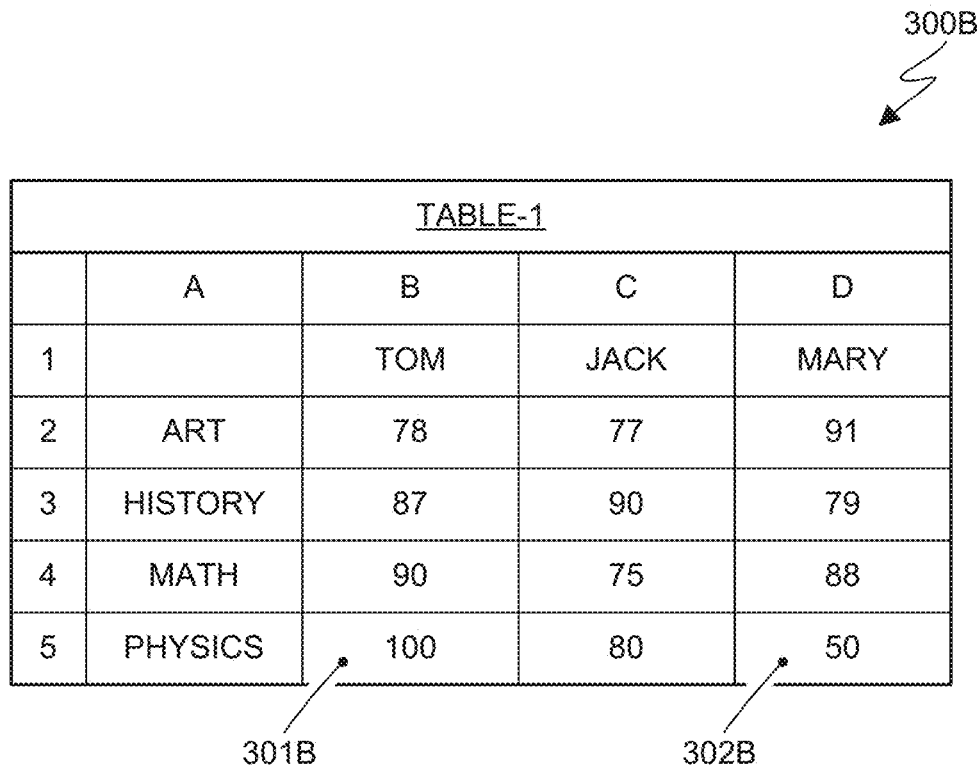
FIG. 3B shows a portion of a spreadsheet, in accordance with at least one embodiment of the present invention.

Tables 300A and 300B, respectively of FIGS. 3A and 3B (sometimes herein referred to as Table-1, showing the same table, respectively before and after a data modification) shows a portion of a spreadsheet, which is provided as an example for describing the embodiments of the present invention. In Table-1, for three students (Tom, Jack and Mary), exam scores of four subjects (Art, History, Math and Physics) are shown. Table-1 is shared by a plurality of users including for example, at least, User-W, User-X, User-Y and User-Z.

In Table-1, "Tom", "Jack" and "Mary" are column labels, and "Art", "History", "Math" and "Physics" are row labels. These labels are shown for easy understanding of the meaning of data in Table-1. In some embodiments of the present invention, these labels are omitted. In yet other embodiments of the present invention, these labels can also be edited by multiple users who share Table-1. In Table-1, each score (or label) may be identified by a unique cell ID. In one embodiment of the invention, a cell ID can be formed by concatenating row ID and column ID (such as [row column]) or further concatenated with the table name (such as [table-name row column]). For example, the data cell with score "67" of FIG. 3A may have an ID "5B", formed by a concatenation of row ID and column ID of this data cell. Similarly, the data cell with label "Jack" may have an ID "1C".

Referring to Table-1 as an example, if a user (for example "User-W") changes Tom's score of Physics from "67" 301A to "97", one embodiment of the invention generates and stores a message containing the following information:

Message_ID: 0001
Modifier: "User-W"
Change Date and Time: 2017.02.01, 15:30:48
Table Name: "Table-1"
Cell_ID: 5B
Content before Change: "67"
Content after Change: "97"

The above information items listed for a message is only an example. The invention is not limited to the above information. A message may be formed of more or fewer information items. For example, the information item "Message ID" may be removed since the information item "Change Date and Time" is a timestamp, which can also function as a unique ID. Whenever a user changes a data cell of the shared Table-1, a corresponding message is generated and stored. The generated messages are stored in the form of a message queue according to the information item "Message ID" or "Change Date and Time".

One embodiment, for example, omits from the message the information items "Content beforeChange" and "Content after Change" since the immediate preceding and following message in the queue reveal the omitted information. For example, consider the following message queue:

(Message_ID: 0001; Cell_ID: 5B; Content before Change: "67"; . . . )
(Message_ID: 0002; Cell_ID: 5B; Content before Change: "97"; . . . )
(Message_ID: 0003; Cell_ID: 5B; Content before Change: "100"; . . . )

The messages, taken together, contain an audit trail such that the change recorded by message with Message_ID "0001" changes the data cell with Cell_ID "5B" from "67" to "97", and then the change recorded by message with ID "0002" changes the data cell with Cell_ID "5B" from "97"

to "100". Note: for clarity, the above message queue shows only a part of information items.

Referring back to FIG. 2, the impacted object determining operation 220 determines whether there is a representational object that is based on the datum (or data) being changed. As explained above, a representational object is based on data (for example in a data table or any other data structure such as a relational database), and just a few examples of representational object include: (i) bar chart; (ii) pie chart; (iii) line chart; (iv) area chart; (v) scatter chart; (vi) Gantt chart; (vii) program (or project) evaluation and review technique (PERT) chart; (viii) Smith chart; (ix) candlestick chart; (x) Kagi chart; (xi) bubble chart; (xii) radar chart; (xiii) streamgraph; and (xiv) pivot table, etc. One or more of these, and other representational objects, help to visualize and understand large quantities of data and the relationships between parts of the data.

Figure 4A:
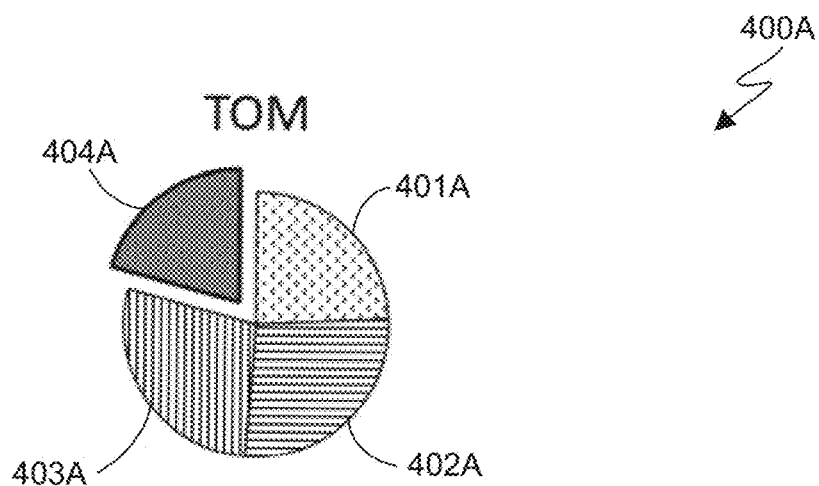
FIG. 4A shows an example of a representational object, in accordance with at least one embodiment of the present invention.

FIG. 4A shows an example of a representational object that is based on data in Table-1 in FIG. 3A. Specifically, the representational object is a pie chart that shows Tom's scores of four subjects in Table-1, wherein the slices denoted by 401A-404A represents Tom's scores of art, history, math and physics, respectively. That is, from the pie chart, a viewer can easily understand contribution of the four subjects (art, history, math and physics) to Tom's total score. In FIG. 4A, the slice 404A represents Tom's physics score.

Figure 4B:
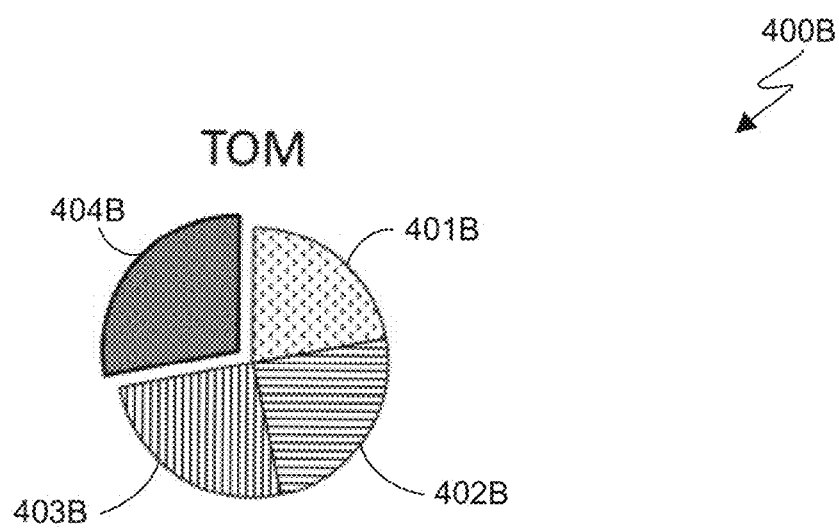
FIG. 4B shows an example of a representational object, in accordance with at least one embodiment of the present invention.

In one embodiment of the invention, a representational object (also simply referred to as "an object" hereinafter) such as the pie chart 400 of FIGS. 4A and 4B is created by a user such as User-X by using a graphical user interface (GUI) of a spreadsheet application. The pie chart can be stored by the spreadsheet application in any data structure. In one embodiment of the invention, the pie chart 400A of FIG. 4A is stored in the following data structure:

```
Object pie_chart1 {
Creator= "User-X";
DataSource=(Table-1.2B, Table-1.3B, Table-1.4B, Table-1.5B);
...
}
```

In this data structure, the name of the object is "pie_chart1" (see pie charts 400A and 400B respectively of FIGS. 4A and 4B (the same pie chart respectively before and after a change)). Attribute "Creator" represents the creator of this object, and its value "User-X" shows it is User-X who creates this object. Another attribute DataSource shows which data cells in which tables the object pie_chart1 is based on. In this example, the data cells with Cell_IDs 2B, 3B, 4B and 5B in Table-1 are used as data source to form pie_chart1. For example, Cell_ID 2B represents the datum (78) at the intersection of row 2 (Art) and column B (Tom). The attribute DataSource is recorded with Cell_IDs of all data cells that are represented by the pie chart of FIGS. 4A and 4B. In the case that there are a plurality of tables, a name of the table is also included in Cell_IDs.

The above data structure is an example to show how a spreadsheet application may store an object. In some embodiments of the present invention, the data structure includes other attributes such as color of each slice of the pie chart, angles around x, y or z axis of the pie chart, etc. In some embodiments, a representational object is stored, for example, in the form of an extensible markup language (XML) file or in javascript object notation (JSON). Without regard as to the form in which an object is stored, information about the data source is included.

Now referring back to FIG. 2 and the representational object determining operation 220 of flowchart 200, in one embodiment of the invention, determining whether there is a representational object that is based on the data cell (or datum) being changed is performed by checking all objects to see which object(s) contains a data source that is changed as shown in the message. Referring to Table-1 of FIG. 3A and pie_chart1 of FIG. 4A as examples, when a message with Message ID "0001" as shown above is generated in response to User-W changing data cell "5B" of table "Table-1 ", each object is checked to see if its data source contains a data cell "Table-1.5B", which can be done by searching the attribute of DataSource of the object pie_chart1. In this case, the attribute of DataSource of the object pie_chart1 contains data cell "Table-1.5B", which means the object pie_chart1 would be impacted if the data cell "Table-1.5B" is changed. Therefore, the object pie_chart1 is determined as a representational object that is based on the data cell being changed, that is, an impacted object.

Referring back to FIG. 2, in change alerting operation 230, in response to determining that there is a representational object that is based on the data being changed, a second user associated with the representational object is alerted based on information in the message. In one embodiment of the invention, the second user is one or more of: (i) a user who creates the representational object; (ii) a user who modifies the representational object; and/or (iii) a user who operates on the representational object. In the case that the second user operates on the representational object, for example, the operation might be clicking on, or hovering over, or otherwise interacting with the representational object.

In one embodiment of the invention, if change alerting operation 230 determines that the creator of an object should be alerted, the one or more second users may also include the first user, if the first user is the creator of the impacted object. Determining who should be alerted (who is associated with the object) can be pre-defined. That is, if the first user changes a data cell, and he/she will be alerted if the first user is associated with an object that is based on the data cell.

Along with the examples (two paragraphs above) with respect to FIGS. 3A and 4A, if only the creator of an object is defined as the user who is associated with the object, User-X would be the second user and would be alerted since User-X is the creator of the object pie_chart1. In short, User-W changes data cell with ID "5B", the object pie_chart1 created by User-X is at least partly based on the data cell with ID "5B", so User-X is alerted.

In some embodiments of the invention, alerting the second user who is concerned with (associated with, references, responds to, or is otherwise interested in) the representational object using the message further comprises alerting, by a visual clue, one or more second users that are concerned with the representational object. The visual clue is for example a bubble, a thumbnail, or a link to be presented in a GUI to the second user. In other embodiments, other forms of alerts can be applied such as a hint or a small window that pops up. In one embodiment of the invention, in the visual clue, information in the message may be used to notify the second user (User-X) that the change made by the first user (User-W) impacts the object pie_chart1 in text, for example. If the second user wants to know more details, he or she may do so by clicking the visual clue.

In some embodiments of the present invention, the method in FIG. 2 further comprises: in response to operation on the visual clue by a second user, displaying the representational object to the second user, and highlighting a change of the representational object caused by the change of the data.

For the message, one message is generated each time there is a change made to the data in the cell of the data table. Thus, one or more messages may be generated during the period from a start time to time of operation on the visual clue. The change of the representational object is highlighted based on the one or more messages. If the second user does not cause any modification to the representational object, the start time is the time of opening the shared data table; and if the second user causes modification to the representational object, the start time is the time of last modification to the representational object caused by the second user. A series of changes to the same cell of a data table is referred to herein as a change history of the cell. In some embodiments of the present invention, the change history of a cell is represented in the representational object by a series of respectively corresponding change indicators.

Figure 5A:
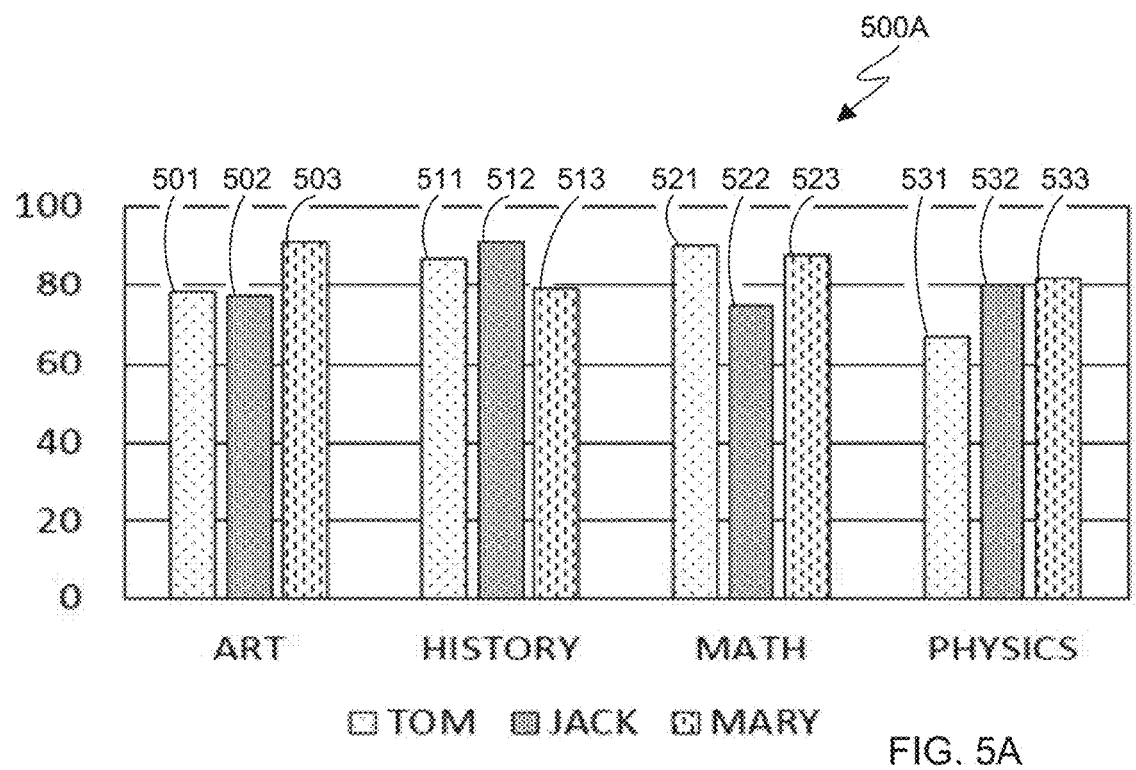
FIG. 5A shows an example of a representational object, in accordance with at least one embodiment of the present invention.
Figure 5B:
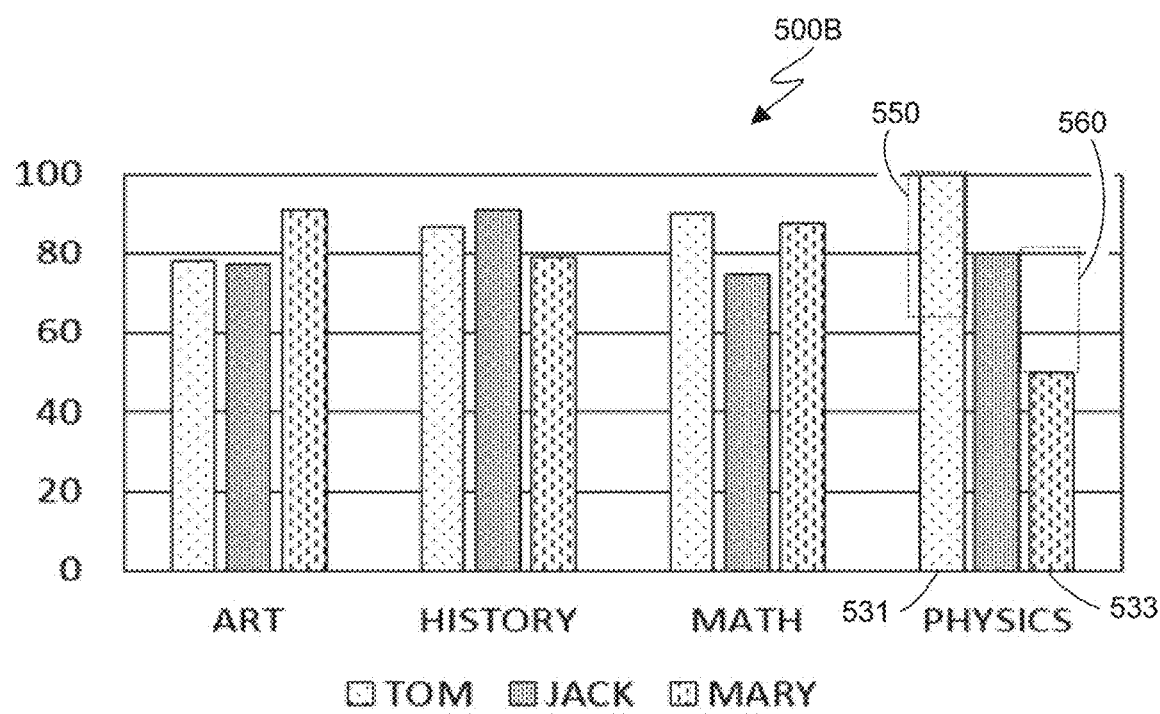
FIG. 5B shows an example of a representational object, in accordance with at least one embodiment of the present invention.

FIG. 5A shows another example of a representational object that is based on data in Table-1 in FIG. 3A. The representational object is a bar chart that shows Tom's, Jack's and Mary's scores in the four subjects of Table-1. Specifically, Tom's scores are represented by bars 501, 511, 521 and 531. Jack's scores are represented by bars 502, 512, 522 and 532. And Mary's scores are represented by bars 503, 513, 523 and 533. From the bar chart, a viewer can easily compare the scores of the four subjects (art, history, math and physics) for Tom, Jack and Mary. In one embodiment of the invention, the bar charts 500A and 500B, respectively of FIGS. 5A and 5B, are stored in the following data structure:

```
Object bar_chart1 {
  Creator= "User-Y";
  DataSource=( {Table-1.2B, Table-1.3B, Table-1.4B, Table-1.5B},
   {Table-1.2C, Table-1.3C, Table-1.4C, Table-1.5C},
   {Table-1.2D, Table-1.3D, Table-1.4D, Table-1.5D});
   ...
}
```

Along with the examples above with respect to FIGS. 3A, 4A and 5A, if after User-X creates the object pie_chart1 and User-Y creates the object bar_chart1, User-W changes data cell 5B from "67" (301A) to "97", then User-Z changes data cell 5B from "97" to "100" (301B), and then User-W changes data cell 5D from "82" (302A) to "50" (302B), the following message queue is generated and stored.

(Message ID: 0001; Modifier: "User-W";Cell ID: 5B; Content before Change: "67"; . . . )

(Message ID: 0002; Modifier: "User-Z";Cell ID: 5B; Content before Change: "97"; . . . )

(Message ID: 0003; Modifier: "User-W";Cell ID: 5D; Content before Change: "82"; . . . )

At this time, due to the collaborative environment, the modified data (that is, "100" 301B in data cell 5B and "50" 302B in data cell 5D) will be updated to all users. FIG. 3B shows the state of Table-1 after the three changes made by User-W and User-Z.

If only the creator of an object is defined as a user who is concerned with the object, at this time, in response to operation on the visual clue (hint or bubble) by User-X, in one embodiment of the invention, the highlighting includes comparatively displaying the original representational object and the representational object after changing. In this case, based on the message queue, only messages 0001 and 0002 are used to alert User-X since the change recorded in message 0003 does not impact the object pie_chart1. That is, in this embodiment, in response to the visual clue being clicked by User-X, FIGS. 4A and FIG. 4B are displayed to User-X at the same time so that User-X can easily understand what changes to pie_chart1 took place.

Since after the change recorded in message 0001, User-X does not click the visual clue, the accumulated messages 0001 and 0002 would be used to track back what the original data is. By using information in the two messages, it is possible to determine that the original data in data cell 5B is "67", thus the FIG. 4A can be displayed to User-X even if it has been changed twice by other users.

If only the creator of an object is defined as a user who is concerned with the object at a given time, in response to operation on the visual clue (hint or bubble) by User-Y, in one embodiment of the present invention, the accumulated changed parts of bar_chart1 are highlighted as shown in FIG. 5B (see 550 and 560 showing changes in the respective lengths of bars 531 and 533). In this case, based on the message queue, all of messages 0001, 0002 and 0003 are used to alert User-Y since all of the changes recorded in the three messages impact the object bar_chart1. That is, in this embodiment, in response to the visual clue being clicked by User-Y, FIG. 5B is displayed to User-Y so that User-Y can easily understand what changes to bar_chart1 took place.

Since after the change recorded in message 0001 or message 0002, User-Y does not click the visual clue, the accumulated messages 0001 to 0003 would be used to track back what the original data is. By using information in the three messages, we can know that, the original data in data cell 5B is "67" and the original data in data cell 5D is "82". Knowing that the data cell 5B is changed from "67" to "100" and the data cell 5D is changed from "82" to "50", a difference can be computed and shown in FIG. 5B by making the part representing the difference to flash, for example, as shown in FIG. 5B by rectangles 550, 560 with dotted lines. In another embodiment of the invention, comparatively displaying the original representational object and the representational object after changing includes overlapping and displaying alternatively the original object and the current object to highlight the difference.

The above description applies to a case where the second user is online. In some embodiments of the present invention, messages directed to the second user that are generated while the second user is offline, will be accumulated, and sent to the second user when the second user comes online.

In some embodiments of the present invention, the method of FIG. 2 further comprises: in response to operation on the visual clue by the second user, information is displayed with respect to the change history of the representational object along with the representational object. Along with the examples in FIGS. 3A, 4A and 4B, in response to clicking the visual clue, while FIGS. 4A and 4B are comparatively displayed, a history can be displayed at the same time as follows. In FIG. 4B, the slices denoted by 401B-404B represents Tom's scores of art, history, math and physics after changing, respectively.

User-W changed Table-1 cell 5B to "97" at 15:30:48
User-Z changed Table-1 cell 5B to "100" at 16:20:22

This change history may allow the alerted users to know a complete history of changes to objects with which he or she is concerned. The above history is only provided as a simple example. Other information such as the impacted object and the content before change can be also included in the history.

For the user who is concerned with the representational object, we use the creator of the object as an example to explain the invention in the above description. In some embodiments of the present invention, if a user who modifies the representational object is defined as the user who is concerned with the representational object, an attribute "Modifier" of the object can be set and used in a similar manner as with the attribute "Creator" to identify one or more modifiers of an object.

In some embodiments of the present invention, a user who operates on the representational object is defined as the user who is concerned with the representational object. An operation history for objects is maintained to identify any user who ever operated (for example, clicked) on a respective object. For example, whenever an operation takes place, information on the user who performed the operation, the operation date and time and the object is recorded. In the spreadsheet application, one or more of the modifier, creator or operator can be selectively set as the user who is concerned with (also herein referred to as "associated with") the representational object.

The present invention may be a system, a method, and/or a computer program product. The computer program product may include a computer readable storage medium (or media) having computer readable program instructions thereon for causing a processor to carry out aspects of the present invention.

In some embodiments of the present invention, there is a system for generating data change alerts in a collaboration environment. The system comprises one or more processors and a memory coupled to at least one of the one or more processors. The system comprises a set of computer program instructions stored in the memory and executed by at least one of the one or more processors in order to perform action of in response to a first user changing data in a cell of a data table, generating a message that contains information on the changing. The system comprises a set of computer program instructions stored in the memory and executed by at least one of the one or more processors in order to perform action of determining whether there is a representational object that is based on the data being changed. The system comprises a set of computer program instructions stored in the memory and executed by at least one of the one or more processors in order to perform action of in response to determining that there is a representational object that is based on the data being changed, alerting a second user that concerns with the representational object by using information in the message.

In some embodiments of the system, the alerting comprises rendering a visual clue to the second user. The system may further comprises a set of computer program instructions stored in the memory and executed by at least one of the one or more processors in order to perform the action of: in response to operation on the visual clue by a second user, displaying the representational object to the second user, and highlighting change of the representational object caused by the change of the data.

In some embodiments of the system, the one or more messages are generated during the period from a start time to time of operation on the visual clue. One message is generated each time a change is made to the data in the cell of the data table. The corresponding change in the representational object is highlighted based on the one or more messages. The start time is one of: time of opening the data table if the second user does not cause any modification to the representational object; or time of last modification to the representational object caused by the second user.

In some embodiments of the system, the change altering operation 230 (see FIG. 2) includes alerting the second user going online from offline. In other words, the alerting takes place in response to the second user coming online. For example, if the second user is offline at the time of determining that there is an object that is based on data being changed, the second user will be alerted in response to the second user coming online.

In some embodiments of the system, the data table is a table from a database or a spreadsheet.

In some embodiments of the system, the system further comprises a set of computer program instructions stored in the memory and executed by at least one of the one or more processors in order to perform action of: in response to operation on the visual clue by the second user, displaying information on change history of the representational object along with the representational object.

In some embodiments of the system, the second user belongs to one or more of a user who creates the representational object, a user who modifies the representational object, or a user who operates on the representational object.

In some embodiments of the system, the highlighting includes comparatively displaying the representational object both before and after is it changed.

In some embodiments of the present invention, there is a computer program product for alerting a user to a data change in a collaboration environment. The computer program product comprises a computer readable storage medium having program instructions embodied therewith. The program instructions are executable by a device to perform a method. The method comprises in response to a first user changing data in a cell of a shared data table, generating a message that contains information on the changing. The method further comprises determining whether there is a representational object that is based on the data being changed. The method further comprises in response to determining that there is a representational object that is based on the data being changed, alerting a second user that concerns with the representational object by using information in the message.

In some embodiments of the computer program product, the alerting comprises rendering a visual clue to the second user. The system may further comprises a set of computer program instructions stored in the memory and executed by at least one of the one or more processors in order to perform action of: in response to operation on the visual clue by a second user, displaying the representational object to the second user, and highlighting change of the representational object caused by the change of the data.

In some embodiments of the computer program product, the one or more messages are generated during the period from a start time to time of operation on the visual clue in which one message is generated each time a change to the data in the cell of the data table happens. The change of the representational object is highlighted based on the one or more messages. The start time is one of: time of opening the data table if the second user does not cause any modification to the representational object; or time of last modification to the representational object caused by the second user.

In some embodiments of the computer program product, the altering includes alerting the second user coming online.

In some embodiments of the computer program product, the data table is a table from a database or a spreadsheet.

In some embodiments of the computer program product, the method further comprises: in response to operation on the visual clue by the second user, displaying information on change history of the representational object along with the representational object.

In some embodiments of the computer program product, the second user belongs to one or more of a user who creates the representational object, a user who modifies the representational object, or a user who operates on the representational object.

In some embodiments of the computer program product, the highlighting includes comparatively displaying the original representational object and the representational object after changing.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for highlighting a data change in a collaborative environment, the method comprising:
    detecting, by one or more processors, a first data change, made by a first user, in a cell of a data table;
    in response to detecting the first data change, generating, by one or more processors, a first message that contains first information pertaining to the first data change, and second information pertaining to the first data change;
    determining, by one or more processors, that there exists a representational object that is based on information within the cell of the data table;
    in response to determining that there exists a representational object that is based on information within the cell of the data table:
        updating the representational object based on information in the first message,
        determining, by one or more processors, that there is a second user associated with the representational object,
        determining that the second user is not online,
        generating, by one or more processors, a first alert based on the first information in the first message,
        determining, by one or more processors, that the second user has come online, and
        in response to determining that the second user has come online, sending the first alert to a user interface operated by the second user, wherein the first alert comprises rendering a visual clue in the user interface,
        receiving, from the second user interface, a request for more information with respect to the first alert, and
        in response to receiving the request for more information, sending to the second user interface, the second information;
    wherein:
        the first information comprises the representational object, and
        the second information comprises overlapping and alternately displaying the representational object before the first data change, and the representational object after the first data change, to highlight the difference in the representational object caused by the first data change.

2. The method of claim 1, further comprising:
    receiving a first user input indicating that the second user interacted with the visual clue;
    in response to receiving the first user input:
        displaying the representational object on the user interface, and
        highlighting a change in the representational object based on information in the first message.

3. The method of claim 2, further comprising:
    detecting a second data change in the cell of the data table;
    generating a second message that contains information pertaining to the second data change;
    updating the representational object based on information in the second message; and
    highlighting the second data change in the representational object based on information in the second message.

4. The method of claim 1, further comprising:
    receiving information that the second user is online; and
    in response to receiving the information that the second user is online, displaying the first alert in the user interface.

5. The method of claim 2, further comprising:
    receiving a second user input indicating that the second user interacted with the visual clue;
    in response to receiving the second user input:
        displaying the representational object; and
        displaying information descriptive of a change history of the representational object.

6. The method of claim 1, wherein the second user performed at least one of the following actions:
    created the representational object;
    modified the representational object; or
    operated on the representational object.

7. The method of claim 2, wherein highlighting the change in the representational object comprises comparatively displaying:
    the representational object corresponding to the data table before the first data change is detected; and
    the representational object corresponding to the data table after the first data change is detected.

8. A computer program product for generating data change alerts in a collaborative environment comprising:
    one or more computer readable storage media and program instructions stored on the one or more computer readable storage media, the program instructions comprising instructions to perform:
        detecting, by one or more processors, a first data change, made by a first user, in a cell of a data table;
        in response to detecting the first data change, generating, by one or more processors, a first message that contains first information pertaining to the first data change, and second information pertaining to the first data change;
        determining, by one or more processors, that there exists a representational object that is based on information within the cell of the data table;
        in response to determining that there exists a representational object that is based on information within the cell of the data table:
            updating the representational object based on information in the first message,
            determining, by one or more processors, that there is a second user associated with the representational object,
            determining that the second user is not online,
            generating, by one or more processors, a first alert based on the first information in the first message,
            determining, by one or more processors, that the second user has come online, and
            in response to determining that the second user has come online, sending the first alert to a user interface operated by the second user, wherein the first alert comprises rendering a visual clue in the user interface,
            receiving, from the second user interface, a request for more information with respect to the first alert, and
            in response to receiving the request for more information, sending to the second user interface, the second information;

wherein:
the first information comprises the representational object, and
the second information comprises overlapping and alternately displaying the representational object before the first data change, and the representational object after the first data change, to highlight the difference in the representational object caused by the first data change.

9. The computer program product of claim 8, further comprising instructions to perform:
receiving a first user input indicating that the second user interacted with the visual clue;
in response to receiving the first user input:
displaying the representational object on the user interface, and
highlighting a change in the representational object based on information in the first message.

10. The computer program product of claim 9, further comprising instructions to perform:
detecting a second data change in the cell of the data table;
generating a second message that contains information pertaining to the second data change;
updating the representational object based on information in the second message; and
highlighting the second data change in the representational object based on information in the second message.

11. The computer program product of claim 8, further comprising instructions to perform:
receiving information that the second user is online; and
in response to receiving the information that the second user is online, displaying the first alert in the user interface.

12. The computer program product of claim 9, further comprising instructions to perform:
receiving a second user input indicating that the second user interacted with the visual clue;
in response to receiving the second user input:
displaying the representational object; and
displaying information descriptive of a change history of the representational object.

13. The computer program product of claim 8, wherein the second user performed at least one of the following actions:
created the representational object;
modified the representational object; or
operated on the representational object.

14. The computer program product of claim 9, wherein highlighting the change in the representational object comprises comparatively displaying:
the representational object corresponding to the data table before the first data change is detected; and
the representational object corresponding to the data table after the first data change is detected.

15. A computer system for generating data change alerts in a collaboration environment comprising:
one or more computer processors;
one or more computer-readable storage media;
program instructions stored on the computer-readable storage media for execution by at least one of the one or more processors, the program instructions comprising instructions to perform:
detecting, by one or more processors, a first data change, made by a first user, in a cell of a data table;
in response to detecting the first data change, generating, by one or more processors, a first message that contains first information pertaining to the first data change, and second information pertaining to the first data change;
determining, by one or more processors, that there exists a representational object that is based on information within the cell of the data table;
in response to determining that there exists a representational object that is based on information within the cell of the data table:
updating the representational object based on information in the first message,
determining, by one or more processors, that there is a second user associated with the representational object,
determining that the second user is not online,
generating, by one or more processors, a first alert based on the first information in the first message,
determining, by one or more processors, that the second user has come online, and
in response to determining that the second user has come online, sending the first alert to a user interface operated by the second user, wherein the first alert comprises rendering a visual clue in the user interface,
receiving, from the second user interface, a request for more information with respect to the first alert, and
in response to receiving the request for more information, sending to the second user interface, the second information;
wherein:
the first information comprises the representational object, and
the second information comprises overlapping and alternately displaying the representational object before the first data change, and the representational object after the first data change, to highlight the difference in the representational object caused by the first data change.

16. The computer system of claim 15, further comprising instructions to perform:
receiving a first user input indicating that the second user interacted with the visual clue;
in response to receiving the first user input:
displaying the representational object on the user interface, and
highlighting a change in the representational object based on information in the first message.

17. The computer system of claim 16, further comprising instructions to perform:
detecting a second data change in the cell of the data table;
generating a second message that contains information pertaining to the second data change;
updating the representational object based on information in the second message; and
highlighting the second data change in the representational object based on information in the second message.

18. The computer system of claim 15, further comprising instructions to perform:
receiving information that the second user is online; and
in response to receiving the information that the second user is online, displaying the first alert in the user interface.

19. The computer system of claim 16, further comprising instructions to perform:

receiving a second user input indicating that the second user interacted with the visual clue;

in response to receiving the second user input:
   displaying the representational object; and
   displaying information descriptive of a change history of the representational object.

20. The computer system of claim 16, wherein highlighting the change in the representational object comprises comparatively displaying:

the representational object corresponding to the data table before the first data change is detected; and the representational object corresponding to the data table after the first data change is detected.

\* \* \* \* \*